No. 868,664. PATENTED OCT. 22, 1907.
A. B. HERRICK.
PROCESS OF MAKING RAIL BONDS.
APPLICATION FILED MAY 5, 1904.

2 SHEETS—SHEET 1.

WITNESSES:
D. T. Davis
G. W. Draywell

INVENTOR:
Albert B. Herrick
by his attorney
J. B. Fay

No. 868,664. PATENTED OCT. 22, 1907.
A. B. HERRICK.
PROCESS OF MAKING RAIL BONDS.
APPLICATION FILED MAY 5, 1904.

2 SHEETS—SHEET 2.

WITNESSES:
D. G. Davis
G. W. Saywell

INVENTOR:
Albert B. Herrick
by his attorney
J. S. Fay

UNITED STATES PATENT OFFICE.

ALBERT B. HERRICK, OF RIDGEWOOD, NEW JERSEY, ASSIGNOR TO THE ELECTRIC RAILWAY IMPROVEMENT COMPANY, OF CLEVELAND, OHIO, A CORPORATION OF OHIO.

PROCESS OF MAKING RAIL-BONDS.

No. 868,664.

Specification of Letters Patent.

Patented Oct. 22, 1907.

Application filed May 5, 1904. Serial No. 206,497.

*To all whom it may concern:*

Be it known that I, ALBERT B. HERRICK, a citizen of the United States, and a resident of Ridgewood, county of Bergen, and State of New Jersey, have invented a new and useful Improvement in Processes of Manufacturing Rail-Bonds, of which the following is a specification, the principle of the invention being herein explained, and the best mode in which I have contemplated applying that principle, so as to distinguish it from other inventions.

My invention relates to a process of manufacturing rail-bonds, and has especial reference to bonds which are adapted to be used in electrical bonding. Said invention consists of steps hereinafter fully described and specifically set forth in the claims.

The annexed drawings and the following description set forth in detail one mode of carrying out the invention, such disclosed mode constituting but one of various ways in which the principle of the invention may be used.

Figure 1:
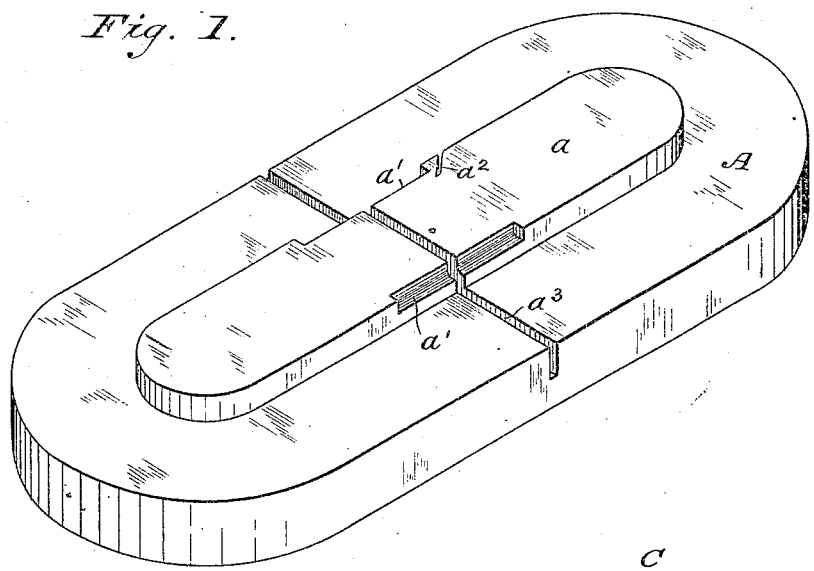
Figure 2:
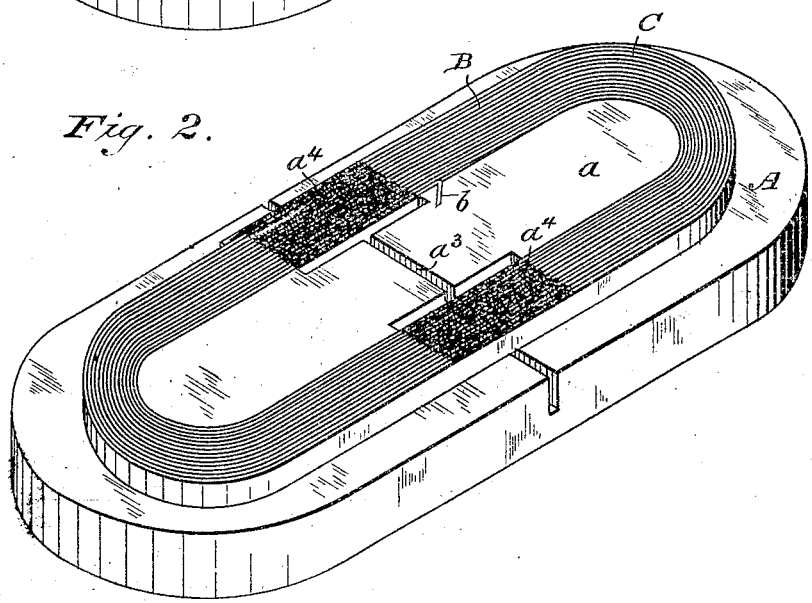
Figure 3:
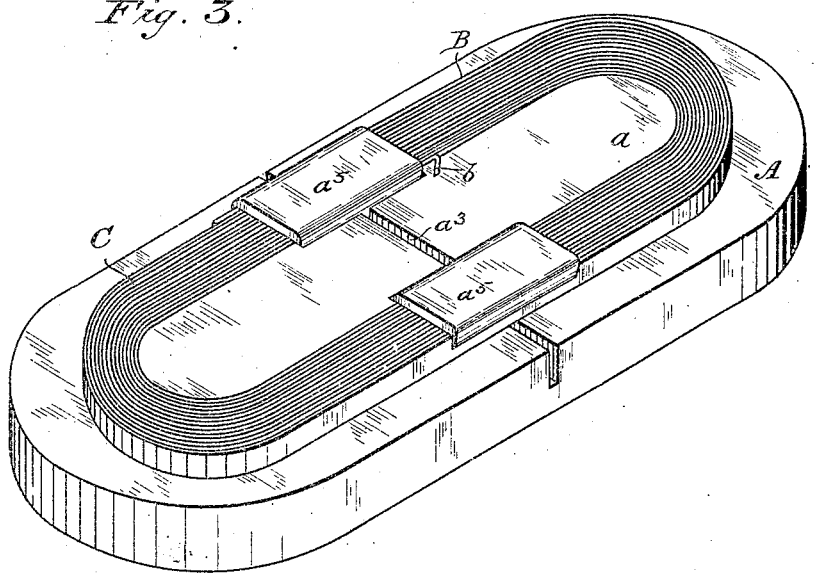
Figure 4:
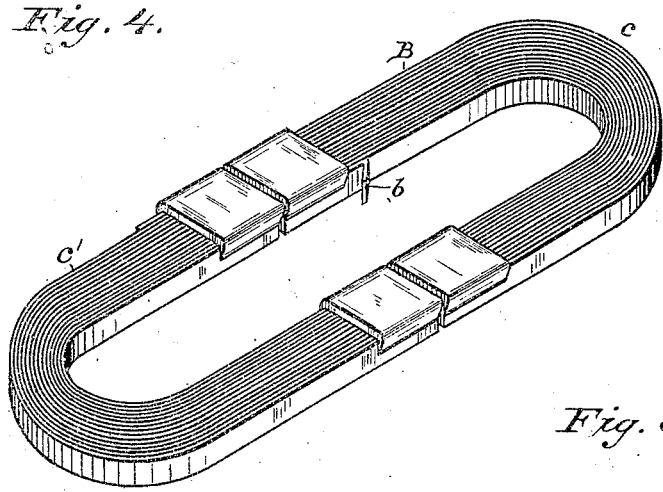
Figure 5:
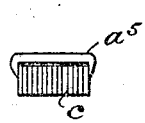

In said annexed drawings:—Figure 1 represents a perspective view of a pattern or former used in manufacturing my improved bond. Fig. 2 represents the same view as Fig. 1 with a structure composed of copper strands wrapped upon the former and diametrically opposite portions of the same covered with a flux. Fig. 3 represents the same with the flux covered by a surrounding cap of solder. Fig. 4 is the same with the structure cut asunder into two identical parts through the center of the solder strips. Fig. 5 represents an end elevation of one of the terminals of a completed bond.

In the manufacture of my improved bond I utilize a pattern or former A, Fig. 1, provided with a central raised portion or boss $a$ cut away at two diametrically opposite sides as $a'$ and having a small notch $a^2$. The cut-away portions $a'$ are designed to receive the ends of solder strips, hereinafter more fully described, and enable same to bind closely upon the copper strands of the bonds. The former A has a central transverse slot or fissure $a^3$, penetrating it to a depth somewhat below the lower surface of the boss $a$. One end $b$ of the bonding strand B is fastened in the notch $a^2$ and by suitable apparatus the bonding wire B is wound spirally around the central boss $a$ until the desired quantity has been wound into an elliptically shaped structure C, as shown in Fig. 2 each successive convolution of strand B being wound upon the previous convolution. A flux that is non-corrosive to metals, such as a resinous paste containing an alkali salt, is then spread over the structure, over and for some distance on either side of the fissure $a^3$, as shown in Fig. 2 at $a^4$. This flux is adapted, when a current of electricity is passed through the bond, to integrally bind together the copper conducting strands and the solder strips, hereinafter described. Especially prepared solder strips $a^5$ are then fitted over the structure, upon and over the flux $a^4$, extended into the cut-away portions $a'$ of the boss $a$, and fastened to the same by pressure, all as can be seen in Fig. 3. These solder strips are thus fastened by pressure while cold, inasmuch as each reheating of solder lessens its electrical conductivity, and, in the use to which it is applied in my invention, this would materially reduce the efficiency of the finished bond. As can be seen from the drawings, the flux portions and the solder strips lie transversely and centrally over the fissure $a^3$. The structure C is then sawed into two horse-shoe shaped bonds $c$ and $c'$ through such central transverse plane of the solder strips, the depth of the fissure $a^3$ enabling this to be easily accomplished. The end $b$ of the bonding strand B that is fastened in the notch $a^2$ is then released therefrom and fastened against the inner side of the bond to which it is attached, $c$ as shown in Fig. 4, and the two horse-shoe shaped bonds are then complete.

It is not desired or intended to lay especial stress upon the shape of the former or pattern A herein set forth, as any desired shape may be used. Neither would it be always necessary to make only two bonds on one pattern at one time, nor to make them identical, as more than two might be manufactured from one series of strands, and they might, for especial purposes, be of different shapes and sizes.

Other modes of applying the principle of my invention may be employed instead of the one explained, change being made as regards the process herein disclosed provided the steps stated by any one of the following claims or the equivalent of such stated steps be employed.

I therefore particularly point out and distinctly claim as my invention:—

1. In a process of manufacturing rail-bonds, the steps which consist, in forming the bond strands into the desired shape upon a suitable pattern, and then fitting solder strips to said structure over the portions of the same that are to be utilized for the terminals of the bond.

2. In a process of manufacturing rail-bonds, the steps which consist, in forming the bond strands into the desired shape upon a suitable pattern, and then fitting cold solder strips by pressure to said structure over the portions of the same that are to be utilized for the terminals of the bond.

3. In a process of manufacturing rail-bonds, the steps which consist, in forming the bond strands into the desired shape upon a suitable pattern, covering the portions of said structure to be utilized for the terminals of the bonds with a non-corrosive flux, and then fitting solder strips over such flux.

4. In a process of manufacturing rail-bonds, the steps which consist, in forming the bond strands into the desired shape upon a suitable pattern, covering the portions of said structure to be utilized for the terminals of the bonds with a non-corrosive flux, and then fitting cold solder strips by pressure over such flux.

5. In a process of manufacturing rail-bonds, the steps which consist, in winding upon a suitable pattern a strand of conducting material, each successive convolution of such strand around such pattern being wound upon the previous convolution, covering portions of the structure thus formed with a non-corrosive flux, fitting solder strips over such flux, and then cutting through such strips and flux and adjacent portions of the strands to form a plurality of bonds.

6. The process of manufacturing rail-bonds, which consists, in winding upon a suitable pattern a strand of conducting material to form a spiral structure, covering two diametrically opposite portions of said structure with a non-corrosive flux, fitting cold solder strips by pressure around such portions and over such flux, and then cutting through such strips and flux and portions to form two identical bonds.

7. A process for manufacturing rail-bonds, which consists in first winding bond strands about a suitable pattern to form a continuous bond structure or loop, applying and securing soldering material to said structure at diametrically opposite points thereon, and then cutting through said soldering material and structure at both said points.

8. The process of manufacturing rail-bonds, which consists in winding upon a pattern of substantially elliptical outline a strand of conducting material, each successive convolution of such strand being wound upon the previous convolution, covering diametrically opposite portions of the structure thus formed with a non-corrosive flux, fitting solder strips over such flux, and then cutting through such strips and flux and adjacent portions of the strands to form two similar bonds.

Signed by me, this 2" day of May 1904.

ALBERT B. HERRICK.

Attested by—
G. W. SAYWELL,
A. E. MERKEL.